United States Patent
Zawacky et al.

(10) Patent No.: US 6,423,774 B1
(45) Date of Patent: Jul. 23, 2002

(54) CATIONIC ALIPHATIC POLYESTER RESINS AND THEIR ELECTRODEPOSITION

(75) Inventors: Steven R. Zawacky; Raphael O. Kollah, both of Pittsburgh; Craig A. Wilson, Allison Park; Gregory J. McCollum, Gibsonia; Robin M. Peffer, Valencia; Geoffrey R. Webster, Jr., Gibsonia; Venkatachalam Eswarakrishnan, Allison Park; Linda K. Anderson, Pittsburgh, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/531,807

(22) Filed: Mar. 21, 2000

(51) Int. Cl.⁷ .................. C08L 67/03; C08L 67/00; C08G 63/685; C08G 63/688; B05D 5/12
(52) U.S. Cl. .................. 524/845; 524/602; 524/603; 524/901; 528/287; 528/294; 427/58; 427/96; 205/317
(58) Field of Search ................ 524/845, 603, 524/901, 602; 528/287, 284; 427/58, 96

(56) References Cited

U.S. PATENT DOCUMENTS

| | | | |
|---|---|---|---|
| 3,984,299 A | 10/1976 | Jerabek | 204/181 |
| 4,009,133 A | 2/1977 | Jones | 260/29.2 TN |
| 4,017,438 A | 4/1977 | Jerabek et al. | 260/29.2 EP |
| 4,075,141 A | 2/1978 | Porter, Jr. et al. | 260/17.2 |
| 4,148,772 A | 4/1979 | Marchetti et al. | 260/29.2 EP |
| 4,172,822 A | 10/1979 | Patzschke | 260/29.2 E |
| 4,332,711 A | 6/1982 | Kooyamans et al. | 523/402 |
| 4,362,847 A | 12/1982 | Kooijmans et al. | 525/172 |
| 4,390,688 A | 6/1983 | Walz et al. | 528/295.3 |
| 4,609,446 A | 9/1986 | Geist et al. | 204/181.7 |
| 4,609,691 A | 9/1986 | Geist et al. | 523/415 |
| 4,724,254 A | 2/1988 | Geist et al. | 525/523 |
| 4,767,829 A | 8/1988 | Kordomenos et al. | 525/449 |
| 4,769,425 A | 9/1988 | Dervan et al. | 525/528 |
| 4,778,861 A | 10/1988 | Dervan et al. | 525/450 |
| 4,780,524 A * | 10/1988 | Dobbelstein et al. | |
| 4,812,535 A | 3/1989 | Dervan et al. | 525/450 |
| 4,960,828 A | 10/1990 | Higuchi et al. | 525/162 |
| 5,074,979 A | 12/1991 | Valko et al. | 204/181.7 |
| 5,114,993 A * | 5/1992 | Scherping et al. | |
| 5,138,078 A | 8/1992 | Brytus | 549/557 |
| 5,330,796 A | 7/1994 | Kasari et al. | 427/407.1 |
| 5,371,120 A | 12/1994 | Uhlianuk | 523/414 |
| 5,506,284 A * | 4/1996 | McGee | |
| 5,565,508 A | 10/1996 | Hoenel et al. | 523/414 |
| 5,582,704 A | 12/1996 | Valko et al. | 204/501 |
| 5,633,297 A | 5/1997 | Valko et al. | 204/500 |
| 5,712,349 A | 1/1998 | Diefenbach et al. | 525/523 |
| 5,739,213 A | 4/1998 | Freriks et al. | 525/438 |
| 5,811,198 A | 9/1998 | Freriks et al. | 428/482 |
| 5,908,912 A | 6/1999 | Kollah et al. | 528/45 |

FOREIGN PATENT DOCUMENTS

EP    0 469 491 A2    2/1992

\* cited by examiner

*Primary Examiner*—Tae H. Yoon
(74) *Attorney, Agent, or Firm*—Diane R. Meyers; William J. Uhl

(57) ABSTRACT

The present invention is directed to an electrodepositable composition of a resinous phase dispersed in an aqueous medium. The resinous phase includes an ionic polyester polymer prepared from a) an aromatic and/or cycloaliphatic carboxylic acid compound having at least two aromatic and/or secondary aliphatic carboxyl groups, b) a branched aliphatic, cycloaliphatic or araliphatic compound containing at least two aliphatic hydroxyl groups, the aliphatic hydroxyl groups being either secondary or tertiary hydroxyl groups or primary hydroxyl groups attached to a carbon adjacent to a tertiary or quaternary carbon, c) a compound including an ionic salt group or a group which is converted to an ionic salt group, and d) optionally, at least one hydroxyl substituted carboxylic compound comprising at least one tertiary aliphatic carboxyl group and at least two aliphatic hydroxyl groups. The present invention also includes a method for electrocoating a conductive substrate with the described electrodepositable composition. Lastly, the present invention is directed to a conductive substrate coated according to the described method.

56 Claims, No Drawings

CATIONIC ALIPHATIC POLYESTER RESINS AND THEIR ELECTRODEPOSITION

BACKGROUND OF THE INVENTION

1. Field of the Invention:

The present invention relates to electrocoating compositions containing a resinous phase dispersed in an aqueous medium, the resinous phase including an ionic electrodepositable resin with improved corrosion resistance formed from a hydrolytically stable ionic polyester polymer.

2. Description of the Related Art

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

U.S. Pat. No. 5,739,213 and U.S. Pat. No. 5,811,198, both to Freriks et al. disclose certain polyester compositions and glycidyl esters thereof, which are suitable for use in powder coatings. The compositions are resins obtainable by reaction of: an aromatic and/or cycloaliphatic carboxylic acid compound (a), comprising two aromatic and/or secondary aliphatic carboxyl groups or the anhydride thereof; a hydroxyl compound (b) comprising two primary or secondary aliphatic hydroxyl groups; at least one hydroxyl substituted carboxylic acid compound (c) comprising at least one tertiary aliphatic carboxyl group and two primary or secondary aliphatic hydroxyl groups; and optionally, one carboxylic acid compound (d) comprising one carboxyl group. The molar ratio of compounds a:b:c:d is (X+Y−1):X:Y:Z, wherein X ranges from 2 to 8, Y ranges from 2 to 8, and Z ranges from 0 to 2. While these compositions are known for their use in powder coatings, the applicability of their use in eletrocoating resins as a main vehicle has not been explored.

Certain polyesters have previously found use in electrodeposition applications as chain extenders and crosslinking agents. For instance, U.S. Pat. No. 4,148,772 discloses chain extension of polyepoxides with polyester polyols. The polyester polyols are formed from a variety of dicarboxylic acids and diols which were known in the art to be suitable chain extenders. However, use of the disclosed higher molecular weight polyester polyols in chain extension is hindered by the overall hydrolytic instability of the ester bonds in aqueous solutions.

It, therefore, would be advantageous to provide an electrocoating composition that combines the superior coating ability, flexibility, durability and corrosion resistance of polyesters with the hydrolytic stability of traditional electrodepositable compositions.

SUMMARY OF THE INVENTION

In accordance with the present invention, an electrodepositable coating composition comprising a resinous phase dispersed in an aqueous medium is provided. The resinous phase comprises an ionic polyester polymer. The ionic polyester polymer comprises the reaction products of a) an aromatic and/or cycloaliphatic carboxylic acid compound comprising at least two aromatic and/or secondary aliphatic carboxyl groups, or an anhydride thereof, b) a branched aliphatic, cycloaliphatic or araliphatic compound containing at least two aliphatic hydroxyl groups, the aliphatic hydroxyl groups being either secondary or tertiary hydroxyl groups or primary hydroxyl groups attached to a carbon adjacent to a tertiary or quaternary carbon; c) a compound comprising an ionic salt group or a group which is converted to an ionic salt group; and d) optionally, at least one hydroxyl substituted carboxylic compound comprising at least one tertiary aliphatic carboxyl group and at least two aliphatic hydroxyl groups. The ionic polyester polymer preferably has an ionic salt group equivalent weight of 1,000 to 10,000. Preferably, the carboxyl:hydroxyl equivalent ratio of a to b or of a to (b+d) is greater than 1:1.

Also provided in accordance with the present invention is a method for electrocoating a conductive substrate which serves as an electrode in an electrical circuit the conductive substrate and a counter-electrode. The method comprises the steps of: i) immersing the conductive substrate and the counter-electrode into an aqueous electrocoating composition comprising the resinous phase described above, the ionic polyester polymer of the resinous phase having functional groups which are reactive with a curing agent. The electrocoating composition further includes a curing agent having functional groups reactive with the reactive functional groups of the ionic polyester polymer; and ii) applying a direct current between the conductive substrate and the counter-electrode so as to deposit a film derived from the resinous phase.

Provided, also, is a substrate prepared according to the above-described method.

DETAILED DESCRIPTION OF THE PREFERRED EMBODIMENTS

The electrodepositable coating composition of the present invention includes a resinous phase dispersed in an aqueous medium, the resinous phase includes an ionic polyester polymer comprising the reaction product of the following reactants:

a. an aromatic and/or cycloaliphatic carboxylic acid compound comprising at least two aromatic and/or secondary aliphatic carboxyl groups, or an anhydride thereof;

b. a branched aliphatic, cycloaliphatic or araliphatic compound containing at least two aliphatic hydroxyl groups, said aliphatic hydroxyl groups being either secondary or tertiary hydroxyl groups or primary hydroxyl groups attached to a carbon adjacent to a tertiary or quaternary carbon;

c. a compound comprising an ionic salt group or a group which is converted to an ionic salt group; and d. optionally, at least one hydroxyl substituted carboxylic compound comprising at least one tertiary aliphatic carboxyl group and at least two aliphatic hydroxyl groups.

The density of ionic groups on the polyester polymer will affect the ability of the polyester polymer to coat the substrate. Depending upon the final structure of the polyester polymer, the compounds included in the resinous phase and in the aqueous medium and the size, shape and metallic composition of the conductive substrate to be coated, the ionic salt group equivalent weight of the ionic polyester polymer will vary. Preferably, the ionic salt group equivalent weight of the polyester polymer is between 1,000 and 10,000.

As described above, the polyester polymer includes compounds (a)–(c), and optionally, (d). Compound (a) is an aromatic and/or cycloaliphatic carboxylic acid compound comprising at least two aromatic and/or secondary aliphatic carboxyl groups, or an anhydride thereof. Compound (a) is, for example, phthalic acid, tetrahydrophthalic acid, hexahydrophthalic acid methylhexahydrophthalic acid, terephthalic acid, isophthatic acid, decahydronaphthalene dicarboxylic acid, endomethylene tetrahydrophthalic acid, methylendomethylene tetrahydrophthalic acid, or anhydrides thereof, or combinations thereof.

The polyester polymer is also derived from compound (b), a branched aliphatic, cycloaliphatic or aralaphatic compound containing at least two aliphatic hydroxyl groups. The aliphatic hydroxyl groups are either secondary or tertiary hydroxyl groups or primary hydroxyl groups attached to a carbon adjacent to a tertiary or quaternary carbon. A typical class of branched aliphatic compounds having primary hydroxyl groups attached to a carbon adjacent to a tertiary or quaternary carbon are 2,2-dialkyl-propane-1,3-diols. The two 2-alkyl groups can be the same or different and are typically branched or unbranched $C_1$–$C_6$ alkanes. Compound (b) can also be a cycloalphatic or aralphatic compound, such as, for example, hydrogenated bisphenol A, dihydroxyl cyclohexane, dimethylol cyclohexane, dihydroxybenzene or combinations thereof.

Compound (c) is a compound comprising an ionic salt group or a group that is converted to an ionic salt group. The salt group can confer either an overall positive or negative charge to the ionic polyester polymer. A compound which is "a compound comprising an ionic salt group" is a compound which includes the ionic salt group prior to polymerization with compounds (a) and (b). A "compound comprising a group which is converted to an ionic salt group" is a compound which, when reacted with another compound, forms a salt group. An example of a compound comprising a group that is converted to an ionic salt group is epichlorohydrin which, when reacted with, a sulfide and lactic acid, forms a sulfonium group with a lactate counterion.

In a preferred embodiment compounds (a) and (b) are reacted in a ratio such that the carboxyl:hydroxyl equivalent ration of (a) to (b) is greater than one. This ensures that the resultant polymer includes at least one free carboxyl group to be further reacted with, for example, compound (c) or a counterion to add a salt group or a chain extending molecule. Most preferably, the carboxyl:hydroxyl equivalent ratio of (a) to (b) is within the range of 1.1 to 2:1. Because compound (d), when included in the ionic polyester polymer includes both a carboxyl and at least two hydroxyl groups, its addition to the reaction of (a) with (b) alters the overall number of reactive carboxyl groups and hydroxyl groups in the reaction, and, therefore, the preferred ratios of compounds (a), (b) and (d). Preferably, the carboxyl:hydroxyl equivalent ratio of (a) to ((b)+(d)) is 0.1 to 2:1. With respect to the relative amounts of compounds (b) and (d), the ratio of hydroxyl equivalents of (b) to (d) is, preferably, 0.1 to 10:1.

In a first embodiment of (c), the ionic salt group is a salt of a carboxylic acid. The dicarboxylic compound (a) used to prepare the polyester polymer includes carboxyl groups. If compound (a) is reacted with compound (b) in a molar excess of carboxyl groups and in the presence of a suitable counterion, compound (a) can be considered as a compound comprising a group which is converted to an ionic salt group.

However, most anionic resins are more complex. For instance, as described above, when compounds (a) and (b) are reacted with a molar excess of carboxyl groups, the resultant polyester includes reactive carboxyl groups. These reactive carboxyl groups can be reacted with, for example, a variety of co-reactive functional groups containing compounds which can include salt groups or groups which can be converted to salt groups. Examples of co-reactive functional groups are hydroxyl and epoxy and examples of co-reactive functional group-containing compounds are hydroxyl carboxylic acids and epihalohydrins.

In addition to use of carboxylic groups to confer a negative charge to the ionic polyester polymer, the negative charge can be conferred via phosphate groups. As above, the polyester polymer is formed from compounds (a) and (b) in a ratio suitable to create an excess of carboxyl groups, which are reacted with an epihalohydrin. The resultant free epoxy group is reacted with phosphoric acid to form anionic groups. This process is disclosed in European Patent Application No. 0 469 491.

As with the anionic salt groups, cationic salt groups can be either present on compound (c) when it is reacted with (a) and (b) or a polymer thereof, or they can be later formed. For electrodeposition, the cationic salt group is typically a quaternary ammonium group, and amine salt group or a sulfonium group. A method for forming quaternary amine groups in a cationic resin is described in U.S. Pat. No. 5,908,912. A method for forming amine salt groups is described in U.S. Pat. No. 4,017,438. Typically, for electrodepositable resin, the cationic salt group is formed by reacting a compound having an epoxy group with a cationic salt group former such as a tertiary amine, a phosphine or a sulfide. For example, a polyester polymer, formed from reacting compounds (a) and (b) in an excess of carboxyl groups, is reacted with an epihalohydrin, such as epichlorohydrin. The resultant polymer has at least one reactive epoxy group. The epoxy groups are then reacted with a sulfide, for example, thiodiethanol, in the presence of lactic acid to form a positively charged sulfonium salt group with a lactate counterion. The thiodiethanol supplies reactive hydroxyl groups which are later reacted with a curing agent. Sulfonium salt groups are preferred primarily due to their resistance to discoloration.

Compound (d) is a hydroxyl substituted carboxylic compound having one tertiary aliphatic carboxyl group and at least two aliphatic hydroxyl groups. Examples of compound (d) are dimethylolyl propionic acid and dihydroxy pivalic acid.

Common to compounds (a), (b) and (d) are that when they are combined into a polyester polymer, they form sterically hindered ester links which, theoretically, stabilize the ester links in an aqueous solution. It is well-known that esters are unstable in water due to the reversibility of the formation of ester groups in the presence of $H^+$. According to the polyesters of the present invention, the reversibility of the formation of ester links is hampered by the local presence of groups which sterically hinder the ester link. Thus, the aromatic or cycloaliphatic carboxyl groups of compounds (a), the secondary or tertiary hydroxyl groups of (b) and the close proximity of a tertiary or quaternary (c) group to the hydroxyl groups of (b) and (d) yield a polyester polymer which is stable in water. These compounds also exhibit superior stability and effective life once cured on the conductive substrate in contrast to typical polyesters.

Suitable polyesters for use as precursor compounds to the ionic polyester polymer of the present invention are described in U.S. Pat. Nos. 5,739,213 and 5,811,198, described above. One example of the polyester precursor compounds is shown below as formula I:

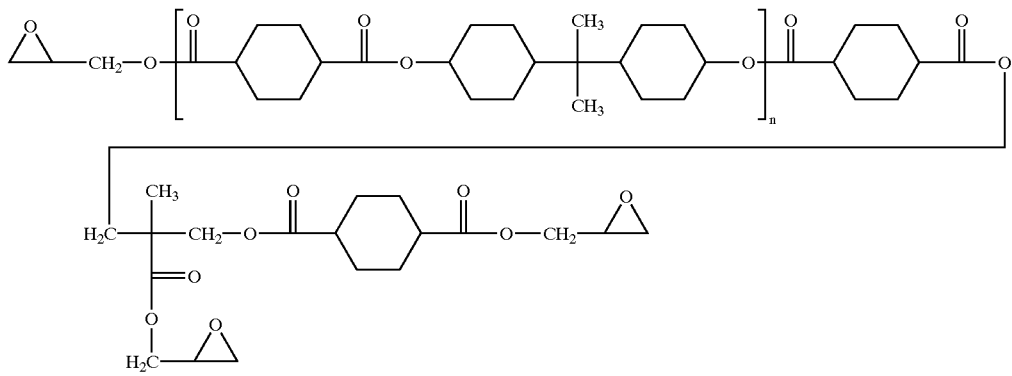

wherein n=1–5.

A second suitable precursor polyester polymer is shown below as formula II:

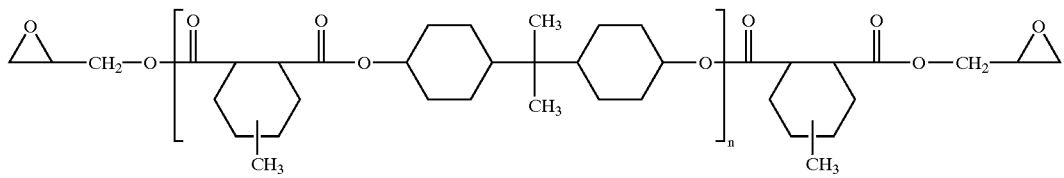

wherein n=1–15.

A third suitable precursor polyester polymer compound has the formula III:

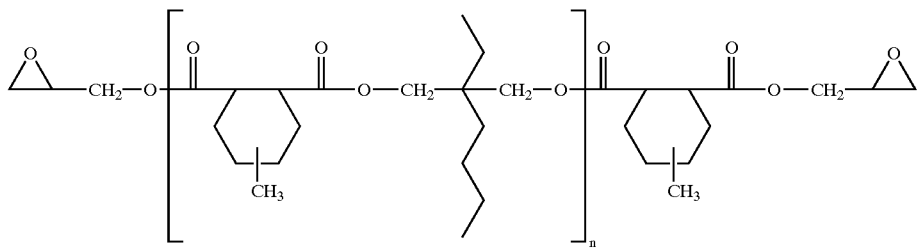

wherein n=1–15.

The above-described polyester precursor compounds are typically reacted with a sulfide, most preferably thiodiethanol, in the presence of an organic acid, such as boric acid, to form a cationic polyester polymer.

The epoxy-terminal polyester materials described above can be extended to produce higher molecular weight polymer compositions. This is achieved by reacting the epoxy-terminal polyester material with a material having two or more pendant or terminal groups that are reactive with the epoxy groups. These epoxy-reactive groups are typically, for example and without limitation, carboxyl, hydroxyl and amine groups. For example, as show in Example III, below, an epoxy-functional polyester is reacted with the di-acid cyclohexanedicarboxylic acid. The reaction between the epoxy-terminal polyester material and the material having epoxy-reactive pendant or terminal groups is preferably performed with a molar excess of epoxy groups. This results in an extended product having terminal epoxy groups that can be reacted with a suitable ionic group forming compound, such as a sulfide, to form an ionic group, such as a sulfonium group.

The ionic polyester polymer contains at least one functional group which is reactive with a curing agent. Typically, the reactive functional group is an active hydrogen group, as described in U.S. Pat. No. 5,908,912, which is most preferably a hydroxyl group. In the case of cationic embodiments of the resins, a hydroxyl group is present on the polyester polymer as a result of the opening of the epoxy ring during formation of the cationic groups.

Preferably, the ionic polyester includes active hydrogens which are generally reactive with curing agents for transesterification, transamidation, and/or transurethanization with isocyanate and/or polyisocyanate curing agents under coating drying conditions. Suitable drying conditions for at least the partially capped or blocked isocyanate curing agents include elevated temperatures, preferably in the range of 93° C. to 204° C., most preferably 121° C. to 177° C., as are known to those skilled in the art. Preferably, the ionic polyester polymer will have an active hydrogen content of 1.7 to 10 milliequivalents, more preferably 2.0 to 5 milliequivalents of active hydrogen per gram of resin solids.

The ionic polyester may also have sterically bulky groups, such as capped isocyanates, grafted thereto in order to improve flexibility of the ionic polyester. These groups can be grafted to the ionic polyester by standard means, such as by reaction of a pendant hydroxyl group of the ionic polyester with a half-capped diisocyanate, i.e., half-capped isophorone diisocyanate.

Typically, the ionic polyester polymer is present in the ED composition in amounts of 55 to 75, preferably 65 to 70 percent by weight based on weight of main vehicle resin solids. By "main vehicle resin solids," it is meant resin solids attributable to the ionic polyester polymer and the curing agent(s) therefor.

The curing agents for the ED composition of the present invention can be a polyisocyanate curing agent which is preferred for use with cationic polyester polymers and an aminoplast curing agent which is preferred for use with anionic polymers. The polyisocyanate curing agent may be a fully capped polyisocyanate with substantially no free isocyanate groups, such as described in the aforementioned U.S. Pat. No. 4,017,438, or it may be partially capped and reacted with the resin backbone as described in U.S. Pat. No. 3,984,299, U.S. Pat. No. 5,074,979 and U.S. Pat. No. 4,009,133. The polyisocyanate can be an aliphatic or an aromatic polyisocyanate or a mixture of the two. Diisocyanates are preferred, although higher polyisocyanates can be used in place of or in combination with diisocyanates.

Any suitable aliphatic, cycloaliphatic or aromatic alkyl monoalcohol or phenolic compound may be used as a capping agent for the polyisocyanate curing agent, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, and amines such as dibutyl amine.

As described above, the curing agent can be an aminoplast resin. Aminoplast resins are the condensation product of an aldehyde, e.g., formaldehyde, acetaldehyde, crotonaldehyde, and benzaldehyde with an amine- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141 to Porter et al. contains a description of useful aminoplast resins and is incorporated herein by reference.

The curing agent is typically present in the ED composition in amounts of 25 to 45, preferably 30 to 35 percent by weight based on weight of main vehicle resin solids.

The ionic electrodepositable resin described above is present in the electrocoating composition in amounts of about 1 to about 60 percent by weight, preferably about 5 to about 25 based on total weight of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron. The concentration of the resinous phase in the aqueous medium is at least 1 and usually from about 2 to about 60 percent by weight based on total weight of the aqueous medium. When the compositions of the present invention are in the form of resin concentrates, they generally have a resin solids content of about 20 to about 60 percent by weight based on weight of the aqueous medium.

Electrodeposition baths are typically supplied as two components: (1) a clear resin feed, which includes generally the ionic electrodepositable resin, i.e., the main film-forming polymer, and/or crosslinker and any additional water-dispersible, non-pigmented components; and (2) a pigment paste, which generally includes one or more pigments, a water-dispersible grind resin which can be the same or different from the main film-forming polymer, and, optionally, additives such as wetting or dispersing aids. Electrodeposition bath components (1) and (2) are dispersed in an aqueous medium which comprises water and, usually, coalescing solvents. In one embodiment, the grind resin includes a polymer having a sterically bulky group grafted thereto in order to improve pigment wetting and/or flexibility of the grind resin polymer. The grafted group is attached to the polymer by any means known to one skilled in the art. For example, a capped diisocyanate group can be grafted onto a hydroxy-functional polymer by reacting the polymer with a half-capped diisocyanate, such as half-capped isophorone diisocyanate, as shown in Example VI, below.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

When the aqueous dispersions as described above are employed for use in electrodeposition, the aqueous dispersion is placed in contact with an electrically conductive anode and an electrically conductive cathode, with the surface to be coated being the cathode in cationic electrodeposition and the anode in anionic electrodeposition. Following contact with the aqueous dispersion, an adherent film of the coating composition is deposited on the substrate which is serving as an electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film. The electrodepositable coating compositions of the present invention can be applied to a variety of electroconductive substrates, especially metals such as steel, aluminum, copper, magnesium and conductive carbon coated materials.

After the coating has been applied by electrodeposition, it is cured usually by baking at elevated temperatures such as about 90° C. to about 260° C. for about 1 to about 40 minutes.

Illustrating the invention are the following Examples which, however, are not to be considered as limiting the invention to their details. All parts and percentages in the following Examples as well as throughout the specification are by weight unless otherwise indicated.

EXAMPLE I

Preparation of an electrodepositable paint using sulfonium polyester resin prepared from saturated polyester epoxy materials.

First, the resin component of the paint was prepared using commercially available modified polyester epoxy materials. A crosslinker was prepared from the following mixture of ingredients:

| INGREDIENTS | PARTS BY WEIGHT |
| --- | --- |
| Isophorone Diisocyanate | 500.00 |
| Methylisobutyl Ketone | 46.70 |
| Dibutyltin Dilaurate | 0.77 |
| Butyl CELLOSOLVE ®[1] | 292.10 |
| Dibutyltin dilaurate | 0.77 |
| Trimethylolpropane | 30.80 |
| Trimethylolpropane | 30.80 |
| Trimethylolpropane | 30.80 |
| Butyl CARBITOL[2] | 215.10 |
| DOWANOL PPh[3] | 215.10 |

[1]The monobutyl ether of ethylene glycol, commercially available from Union Carbide Corporation.
[2]The mono-n-butyl ether of diethylene glycol, commercially available from Union Carbide Corporation.
[3]A monophenyl ether of ethylene glycol, commercially available from Dow Chemical Company.

The isophorone diisocyanate, methylisobutyl ketone and the first portion of dibutyltin dilaurate were charged into a reaction vessel under a nitrogen atmosphere. An ice bath was constructed around the reaction vessel, and the butyl CELLOSOLVE was added dropwise over a period of 45 minutes, maintaining the temperature below 50° C. The reaction mixture was heated to 65° C. and held for 45 minutes until the isocyanate equivalent weight reached 438.6. The isocyanate equivalent weight was determined by reacting a sample of the resin with a known amount of amine, then back-titrating with hydrochloric acid. The second portion of dibutyltin dilaurate and the first portion of trimethylolpropane were added simultaneously through separate addition funnels, and an exotherm was observed. At the peak of the exotherm, the reaction mixture reached 80° C. The reaction mixture was cooled to 75° C. and held for 30 minutes. The second portion of trimethylolpropane was added and a second exotherm was observed. At the peak of the exotherm, the reaction mixture reached 85° C. The reaction mixture was then heated to 100° C. and held for one hour and 20 minutes until the NCO peak observed by IR spectroscopy was essentially gone. The reaction mixture was cooled to 95° C. and the butyl CARBITOL and DOWANOL PPh were added. The reaction mixture was held for 20 minutes then cooled to yield a product at 54.0 percent solids by weight and a number-average molecular weight of 505, as determined by light scattering techniques using a particle size analyzer commercially available from Coulter.

An epoxy additive was prepared from the following mixture of ingredients:

| INGREDIENTS | PARTS BY WEIGHT |
| --- | --- |
| EPON ® 880[1] | 9,018.00 |
| PROPASOL ® B[2] | 3243.0 |
| BISPHENOL ® A[3] | 3,582.00 |
| Ethyltriphenylphosphonium Iodide | 9.00 |
| Thiodiethanol | 4,102.00 |
| PROPASOL B | 202.0 |
| Dimethylolpropionic Acid | 2,252.00 |
| Deionized Water | 841.33 |
| Deionized Water | 9,262.96 |
| Deionized Water | 2,332.40 |
| Deionized Water | 13,494.60 |

[1]The diglycidyl ether of BISPHENOL A, commercially available from Shell Chemical Company.
[2]The mono-n-butyl ether of propylene glycol, commercially available from Union Carbide Corporation.
[3]2,2-bis(4-hydroxyphenol)propane, commercially available from Shell Chemical Company.

The EPON 880 and the first portion of PROPASOL B were charged into a reaction vessel and heated to 66° C. The BISPHENOL A and ethyltriphenylphosphonium iodide were added under agitation and a nitrogen blanket of 5 cubic feet per minute (CFM) was applied. The reaction mixture was heated to 116° C. and held for 20 minutes. The reaction mixture was then heated further to 132° C., and an exotherm was observed. When the batch temperature reached 160° C., a one-hour hold was begun. After the hold was complete, the epoxy equivalent weight was measured by titration with perchloric acid and determined to be within the range of 710–790 equivalents per solid gram. The reaction mixture was cooled to 107° C., then the thiodiethanol, the second portion of PROPASOL B, the dimethylolpropionic acid and the first portion of deionized water were added. Making these additions cooled the reaction mixture. When the additions were complete the reaction mixture was re-heated to 77° C., and maintained at this temperature for six hours. During the hold, the acid value was measured each hour by titration with potassium hydroxide until it was determined to have stalled at a value below 3.0. Next, the reaction mixture was cooled to 21° C. then added to the second portion of deionized water with good agitation over a period of 30 minutes. The third portion of deionized water was added, then the reaction mixture was agitated for 30 minutes. Finally, the last portion of deionized water was added to produce a resin at 34 percent solids by weight.

A sulfonium polyester resin was prepared using the materials prepared above. The resin was prepared from the following ingredients:

| INGREDIENTS | PARTS BY WEIGHT |
|---|---|
| Epoxy resin[1] | 300.00 |
| Dimethylolpropionic acid (DMPA) | 19.83 |
| Butylcarbitol | 35.54 |
| Benzyldimethylamine | 0.48 |
| Butyl CELLOSOLVE | 0.24 |
| Butyl CELLOSOLVE | 11.85 |
| Hexyl CELLOSOLVE[2] | 35.63 |
| Thiodiethanol | 65.03 |
| Lactic Acid | 19.09 |
| 12-Hydroxystearic acid | 8.00 |
| Deionized Water | 14.39 |
| Crosslinker, as prepared above | 246 |
| Rexylcellosolve | 10.8 |
| Dibutyltin Diacetate | 3.18 |
| Plasticizer[3] | 6.48 |
| Epoxy Additive, as prepared above | 105.67 |
| Deionized Water | 780.59 |
| Deionized Water | 100.78 |

[1] A saturated alicyclic polyester epoxy material having an epoxy equivalent weight of 700. The backbone is based on 2 moles of 1,4 cyclohexane dicarboxylic acid, 1 mole of hydrogenated bisphenol A diol and 1 mole of 2,2-dimethylolyl propionic acid, made epoxy functional by reaction with epihalohydrin.
[2] The monohexyl ether of ethylene glycol is commercially available from Union Carbide Corporation.
[3] An adduct of butyl CARBITOL ® and formaldehyde, as described in U.S. Pat. No. 4,891,111, commercially available from PPG Industries, Inc.

The first three ingredients were charged to a reaction vessel and heated under a nitrogen blanket to 125° C. followed by addition of benzyl dimethylamine catalyst and a butylcellosolve rinse. The reaction mixture at 90% solids, was held for a theoretical epoxy equivalent weight (EEW) of 1347 and an acid value of zero, and then was cooled to 100° C. using the second portion of butylcellosolve and hexylcellosolve prior to ternarization, effectively bringing the solids to 79%. The thiodiethanol was added and the reaction mixture was cooled to 80° C. The lactic acid, 12-hydroxystearic acid and the first portion of deionized water were added and the reaction mixture was cooled to 80–85° C. and held for 4½ hours. At that time, the sulfonium content reached 0.190 milliequivalents, as measured by titration with perchloric acid; and the epoxy equivalent weight was 76,500, as measured by titration with perchloric acid. The crosslinker, the dibutyltin diacetate and the plasticizer were added, and the reaction mixture was held at 80° C. for 20 minutes. The epoxy additive and the next portion of deionized water were mixed together in a separate container and heated to 40° C. The reaction mixture was added to the mixture of water and epoxy additive under agitation to produce a clear dispersion of organic resin in an aqueous phase. The final portion of deionized water was added under agitation to yield a product at 33% solids by weight; and a weight-average molecular weight of 62,450, as determined by light scattering techniques using a Coulter particle size analyzer commercially available from Coulter.

Next, an epoxy grind vehicle was prepared from the following mixture of ingredients:

| INGREDIENTS | PARTS BY WEIGHT |
|---|---|
| EPON 880 | 11,120.0 |
| PROPASOL B | 960.0 |
| Nonyl Phenol | 400.0 |
| PROPASOL B | 1,075.0 |
| BISPHENOL A | 4,161.0 |
| Ethyltriphenylphosphonium Iodide | 7.3 |
| PROPASOL B | 12.0 |
| Ethyltriphenylphosphonium Iodide | 7.3 |
| PROPASOL B | 12.0 |
| PROPASOL B | 25.0 |
| PROPASOL B | 1,970.0 |
| DOWANOL PM[1] | 1,055.0 |
| Thiodiethanol | 2,546.0 |
| PROPASOL B | 95.0 |
| Dimethylolpropionic Acid | 2,793.0 |
| Deionized Water | 19,575.5 |
| Deionized Water | 2,749.9 |
| Deionized Water | 16,035.2 |

[1] A monomethyl ether of ethylene glycol, commercially available from Dow Chemical Company.

The EPON 880 was added to a reaction vessel and heated under a nitrogen blanket to 52° C. The first portion of PROPASOL B and the BISPHENOL A were added through separate funnels, over a period of 30 minutes and with good agitation. The reaction mixture was heated to 110° C. The first portion of ethyltriphenylphosphonium iodide and the third portion of PROPASOL B were mixed together and added to the reaction mixture over a period of 2½ minutes. When the addition was complete, the second portion of ethyltriphenylphosphonium iodide and the fourth portion of PROPASOL B were mixed together and added to the reaction mixture over a period of 2½ minutes. The fifth portion of PROPASOL B was then added and the reaction mixture was heated to 129° C. over a period of 15 minutes. At this point an exotherm was observed. When the reaction mixture reached 160° C., a 60 minute hold period was begun, during which time the temperature of the reaction mixture was maintained within a range of 160° C.–182° C. At the end of the hold period, it was confirmed that the epoxy equivalent weight fell within the range of 715–810. The sixth portion of PROPASOL B and the DOWANOL PM were added to the reaction mixture over a period of 15 minutes, while the reaction mixture was cooled. After the addition was complete, the reaction mixture was agitated for five minutes while cooling continued. A vacuum was applied to the reactor to 28 inches of Hg while cooling continued. A nitrogen blanket was applied as necessary to reduce foaming. Cooling continued while the reaction mixture was agitated under the vacuum until the temperature reached 79° C. At that point, the vacuum pump was turned off and the vacuum was broken with a sparge of nitrogen gas. The thiodiethanol and the seventh portion of PROPASOL B were added to the reaction mixture over a period of 20 minutes. This addition further cooled the reaction mixture to 72° C. The dimethylolpropionic acid was added to the reaction mixture over a period of five minutes. An exotherm was observed, and the reaction mixture was maintained at a temperature of 76° C.–79° C. for 90 minutes. After the 90-minute hold, the reaction mixture was sampled each hour until the acid value stalled at a maximum of 3.0. The acid value was determined by titration with potassium hydroxide. When the acid value stalled, a thirty-minute hold was initiated. After this hold, the reaction mixture was added to the first portion of deionized water with good agitation over a period of 30–40 minutes. The second portion of deionized water was added with agitation. The third portion of deionized water was added with agitation to adjust the solids of the product to 30.5% based on weight.

A white tint paste was prepared from the following mixture of ingredients:

| INGREDIENTS | PARTS BY WEIGHT |
|---|---|
| Epoxy grind vehicle, as prepared above | 351.9 |
| SURFYNOL ® 104E[1] | 18.7 |
| Deionized Water | 67.2 |
| Titanium Dioxide | 753.7 |
| SILWET ® L7602[2] | 1.5 |
| Deionized Water | 19.9 |
| Epoxy grind vehicle, as prepared above | 188.4 |

[1] An acetylenic diol surfactant, commercially available from Air Products and Chemicals.
[2] A silicone surfactant, commercially available from Union Carbide Co.

The first five ingredients were added to an appropriate container under agitation, and mixed until well blended. A RED HEAD laboratory dispersion mill, commercially available from Chicago Boiler Company, was filled with 1832 grams of ceramic beads, and cold water was circulated through the unit's cooling jacket. The mixture prepared above was added to the dispersion mill and ground for 45 minutes. After grinding, the particle size was reduced to a Hegman of 7, as measured using a Hegman fineness of grind gauge commercially available from Gardner Company. The mixture was then drained from the mill as agitation continued, until the flow of product nearly stopped. The final two ingredients were mixed together, then added to the mill and immediately drained out the bottom.

An electrodepositable coating composition was prepared using the following mixture of ingredients:

| INGREDIENTS | PARTS BY WEIGHT |
|---|---|
| Sulfonium Polyester Resin, as prepared above | 254.7 |
| White Tint Paste, as prepared above | 98.0 |
| Deionized Water | 648.0 |

The ingredients were added to a plastic gallon container and mixed under gentle agitation. The resulting paint had a pH of 4.37 as measured with an ACCUMET pH meter commercially available from Fisher Scientific; and a conductivity of $673.2 \Omega^{-1}$ as measured with a conductivity meter commercially available from YSI, Inc.

The coating composition was deposited onto zinc-phosphated cold rolled steel test panels commercially available from ACT Laboratories, Inc. as APR 10584. This was done by heating the coating composition to 27° C. then impressing 120 volts between the test panel and a stainless steel anode for two minutes. The test panels were cured for 20 minutes at 177° C. to produce an average film thickness of 1.08 mils. Various physical tests were performed on the coated substrates, as detailed in Table I.

EXAMPLE II

An electrodepositable paint using a standard sulfonium acrylic resin as a comparative example.

A sulfonium-functional acrylic resin was prepared. The resin is commercially available from PPG Industries, Inc. under the trade designation Powercron 920F. An electrodepositable coating composition was formulated therefrom, as described below.

A white tint paste was prepared from the following mixture of ingredients:

| INGREDIENTS | PARTS BY WEIGHT |
|---|---|
| Epoxy grind vehicle, as described in Example I | 351.9 |
| SURFYNOL 104E | 18.7 |
| Deionized Water | 67.2 |
| Titanium Dioxide | 753.7 |
| SILWET L7602 | 1.5 |
| Deionized Water | 19.9 |
| Epoxy grind vehicle, as described in Example I | 188.4 |

The first five ingredients were added to an appropriate container under agitation, and mixed until well blended. A RED HEAD laboratory dispersion mill, commercially available from Chicago Boiler Company, was filled with 2807 grams of ceramic beads, and cold water was circulated through the unit's cooling jacket. The mixture prepared above was added to the dispersion mill and ground for 45 minutes. After grinding, the particle size was reduced to a Hegman of 7, as measured using a Hegman fineness of grind gauge commercially available from Gardner Company. The mixture was then drained from the mill as agitation continued, until the flow of product nearly stopped. The final two ingredients were mixed together, then added to the mill and immediately drained out the bottom.

An electrodepositable coating composition was prepared using the following mixture of ingredients:

| INGREDIENTS | PARTS BY WEIGHT |
|---|---|
| Powercron 920F | 824 |
| White Tint Paste, as prepared above | 297 |
| Deionized Water | 1879 |

The ingredients were added to a plastic gallon container and mixed under gentle agitation. The resulting paint had a pH of 5.48, as measured with an ACCUMET pH meter commercially available from Fisher Scientific, and a conductivity of $521 \Omega^{-1}$ as measured with a conductivity meter commercially available from YSI, Inc.

The coating composition was deposited onto zinc-phosphated cold rolled steel test panels commercially available from ACT Laboratories, Inc. as APR 10584. This was done by heating the coating composition to 27° C. then impressing 120 volts between the test panel and a stainless steel anode for two minutes. The test panels were cured for 20 minutes at 177° C. to produce an average film thickness of 0.97 mils. Various physical tests were performed on the coated substrates, as detailed in Table I.

TABLE I

A Comparison of the Physical Properties of Films Prepared from the Compositions of Examples I-II

| | Example I | Example II (Comparative) |
|---|---|---|
| Bake Schedule | 20 minutes at 177° C. | 20 minutes at 177° C. |
| 20° Gloss[1] | 38 | 53 |
| 60° Gloss[1] | 81 | 86 |

TABLE I-continued

A Comparison of the Physical Properties of Films
Prepared from the Compositions of Examples I-II

|  | Example I | Example II (Comparative) |
|---|---|---|
| Solvent Resistance[2] | 100X, Pass | 100X, Slight Mar |
| Crosshatch Adhesion[3] | 10, no loss of adhesion | 10, no loss of adhesion |

[1]As measured using a Multigloss meter, commercially available from BYK Labotron.
[2]Paper towels soaked with acetone and were rubbed back and forth across the panel for a period of 100 double strokes or until substrate is reveals. Panels are then rated as Pass, Slight Mar, or Mar. Ratings are determined by the amount of deglossing that occurs on the panel. Pass would be no deglossing. Slight Mar would mean that a minimal amount of surface deglossing has occurred while mar would mean that the entire rubbed area has deglossed.
[3]Using a crosshatch adhesion tool with 2.0 mm cutter, the tool was drawn across the panel with enough pressure to reach the metal substrate, then turned 90° and again drawn across the panel. The crosshatch is then taped with 3M 898 tape and checked for loss of paint adhesion. The rating scale is based on 0–10 with 10 being 100% adhesion, 9 being a 10% loss of adhesion, and son on, down to 0 being complete loss of adhesion.

EXAMPLE III

A polyester epoxy backbone composed of a cycloaliphatic dicarboxylic acid and 2-ethyl-2-butyl propane 1,3-diol, a sulfonium resin therefrom and its formulation as a clear coat.

A sulfonium polyester resin was prepared from the following ingredients:

| INGREDIENTS | PARTS BY WEIGHT |
|---|---|
| Epoxy resin[1] | 200.0 |
| 1,4-cyclohexanedicarboxylic acid | 33.4 |
| Methyl isobutyl ketone | 20.9 |
| Ethyltriphenylphosphonium Iodide | 0.35 |
| Methyl isobutyl ketone | 5.0 |
| Methyl isobutyl ketone | 10.0 |
| Half-capped isophorone diisocyanate (IPDI) Integrated Crosslinker[2] | 98.2 |
| Methyl isobutyl ketone | 10.0 |
| Butyl CELLOSOLVE | 50.0 |
| Thiodiethanol | 51.4 |
| Dimethylolpropionic Acid | 22.6 |
| Deionized Water | 19.0 |
| Dibutyltin Diacetate | 9.6 |
| Deionized Water | 306.6 |
| Deionized Water | 239.2 |

[1]A saturated aliphatic cycloaliphatic polyester epoxy material having epoxy equivalent weight of 334. The backbone is based on 2 moles of hexahydro-4-methylphthalic anhydride and 1 mole of 2-ethyl-2-butyl propane 1,3-diol, rendered epoxy functional by reacting with epichlorohydrin.
[2]The half-capped IPDI integrated crosslinker was prepared by reacting 56% of NCO with butyl CELLOSOLVE ® to a theoretical NCO equivalent weight of 471.8, in methyl isobutyl ketone.

The first three ingredients were charged to a reaction vessel and heated under a nitrogen blanket to 125° C. followed by addition of ethyltriphenylphosphonium iodide catalyst and a methyl isobutyl ketone. The reaction mixture at 91.8% solids, 10 was held for a theoretical epoxy equivalent weight (EEW) of 1230 and an acid value of zero, then cooled to 80° C. using the third portion of isobutyl ketone. The half-capped IPDI integrated crosslinker was then added to control exotherm below 100° C. and the reaction held until all the NCO was reacted. The reaction temperature was brought to 80° C. by cooling and addition of the fourth methyl isobutyl ketone and butyl CELLOSOLVE® prior to ternarization, effectively bringing the solids to 74%. The thiodiethanol was added followed by dimethylolpropionic acid and the first portion of deionized water, then the reaction mixture was cooled to 80°–85° C. and held for 4½ hours. At that time, the sulfonium content reached 0.159 milliequivalents, as measured by titration with perchloric acid; and the epoxy equivalent weight was 13,036, as measured by titration with perchloric acid. The dibutyltin diacetate catalyst was then added, and the reaction mixture was held at 80° C. for 20 minutes. The reaction mixture was added to the second portion of water under agitation to produce a clear dispersion of organic resin in an aqueous phase. The final portion of deionized water was added under agitation to yield a product at 35% solids by weight; and a weight-average molecular weight of 7,836, as determined by light scattering techniques using a Coulter particle size analyzer commercially available from Coulter.

An electrodepositable coating composition was prepared using the following mixture of ingredients:

| INGREDIENTS | PARTS BY WEIGHT |
|---|---|
| Sulfonium acrylic resin, as prepared above | 414 |
| Deionized Water | 586 |

The ingredients were added to a plastic gallon container and mixed under gentle agitation. The resulting paint had a pH of 4.33 as measured with an ACCUMET pH meter commercially available from Fisher Scientific; and a conductivity of $724.68^{\Omega-1}$ as measured with a conductivity meter commercially available from YSI, Inc.

The coating composition was deposited onto zinc-phosphated cold rolled steel test panels commercially available from ACT Laboratories, Inc. as APR 10584. This was done by heating the coating composition to 27° C. then impressing 150 volts between the test panel and a stainless steel anode for two minutes. The test panels were cured for 20 minutes at 121° C. to produce an average film thickness of 1.15 mils. Various physical tests were performed on the coated substrates, as detailed in Table II.

TABLE II

Physical Properties of Films Prepared
from the Composition of Example III

| Bake Schedule | 20 minutes at 121° C. |
|---|---|
| 20° Gloss[1] | 63.7 |
| 60° Gloss[1] | 92.1 |
| Solvent Resistance[2] | 100X, Mar |
| Crosshatch Adhesion[3] | 10 no loss of adhesion |

[1-3]see notes 1–3, respectively, for Table I.

EXAMPLE IV

A polyester epoxy backbone composed of a cycloaliphatic dicarboxylic acid and hydrogenated bisphenol A diol, a sulfonium resin therefrom, formulated with aminoplast crosslinker as a clear coat.

A sulfonium polyester resin was prepared from the following ingredients:

| INGREDIENTS | PARTS BY WEIGHT |
|---|---|
| Epoxy resin[1] | 400.00 |
| 1,4-cyclohexanedicarboxylic acid | 62.9 |

-continued

| INGREDIENTS | PARTS BY WEIGHT |
| --- | --- |
| Butyl CELLOSOLVE ® | 41.5 |
| Ethyltriphenylphosphonium Iodide | 0.69 |
| Butyl CELLOSOLVE ® | 10.0 |
| Hexyl CELLOSOLVE ® | 40.0 |
| Thiodiethanol | 75.4 |
| Dimethylolpropionic Acid | 33.1 |
| Deionized Water | 27.8 |
| Cymel 1130 Crosslinker[2] | 94.0 |
| Deionized Water | 610.9 |
| Deionized Water | 438.5 |

[1] A saturated aliphatic cycloaliphatic polyester epoxy material having epoxy equivalent weight of 385 (solids content 83% in MIBK). The backbone is based on 2 moles of hexahydro-4-methylphthalic anhydride and 1 mole of hydrogenated bisphenol A diol, made epoxy functional by reaction with epichlorohydrin.
[2] Cymel 1130 crosslinker is a fully methylated melamine available from Cytec Industries, Inc.

The first three ingredients were charged to a reaction vessel and heated under a nitrogen blanket to 125° C. followed by addition of ethyltriphenylphosphonium iodide catalyst and butyl CELLOSOLVE. The reaction mixture at 91.8% solids, was held for a theoretical epoxy equivalent weight (EEW) of 1664 and an acid value of zero, then cooled to 80° C. using hexyl CELLOSOLVE. At 80° C., the thiodiethanol was added followed by dimethylolpropionic acid and the first portion of deionized water, then the reaction mixture was cooled to 80° C.–85° C. and held for 4½ hours. At that time, the sulfonium content reached 0.185 milliequivalents, as measured by titration with perchloric acid; and the epoxy equivalent weight was 37,667, as measured by titration with perchloric acid. The Cymel 1130 crosslinker was then added followed by a twenty minute hold. The reaction mixture was then added to the second portion of water under agitation to produce a clear dispersion of organic resin in an aqueous phase. The final portion of deionized water was added under agitation to yield a product at 35% solids by weight; and a weight-average molecular weight of 4,244, as determined by light scattering techniques using a Coulter particle size analyzer commercially available from Coulter.

An electrodepositable coating composition was prepared using the following mixture of ingredients:

| INGREDIENTS | PARTS BY WEIGHT |
| --- | --- |
| Sulfonium resin, as prepared above | 409.6 |
| Deionized Water | 590.4 |
| Nacure 1051 (acid catalyst) | 0.7 |

The ingredients were added to a plastic gallon container and mixed under gentle agitation. The resulting paint had a pH of 4.64, as measured with an ACCUMET pH meter commercially available from Fisher Scientific; and a conductivity of $653.82^{\Omega-1}$, as measured with a conductivity meter commercially available from YSI, Inc.

The coating composition was deposited onto zinc-phosphated cold rolled steel test panels commercially available from ACT Laboratories, Inc. as APR 10584. This was done by heating the coating composition to 27° C. then impressing 100 volts between the test panel and a stainless. steel anode for two minutes. The test panels were cured for 20 minutes at 121° C. and produced an average film thickness of 0.84 mils. Various physical tests were performed on the coated substrates, as detailed in Table III.

TABLE III

Physical Properties of Films Prepared from the Composition of Example IV

| Bake Schedule | 20 minutes at 121° C. |
| --- | --- |
| 20° Gloss[1] | 47.8 |
| 60° Gloss[1] | 93.4 |
| Solvent Resistance[2] | 100X, Pass |
| Crosshatch Adhesion[3] | 10, no loss of adhesion |

[1]–[3] see notes [1]–[3], respectively, for Table I.

EXAMPLE V

A polyester epoxy backbone composed of a cycloaliphatic dicarboxylic acid and hydrogenated bisphenol A diol, a phosphatized anionic resin therefrom formulated as a clear coat.

A phosphatized polyester resin was prepared from the following ingredients:

| INGREDIENTS | PARTS BY WEIGHT |
| --- | --- |
| Epoxy resin of Example IV | 400.0 |
| Phloroglucinol | 12 |
| Butyl CELLOSOLVE ® | 86 |
| Ethyltriphenylphosphonium Iodide | 0.4 |
| NIAX 725[1] | 43 |
| Ektasolve EEH[2] | 21.5 |
| Tridecyl Alcohol | 21.5 |
| Phosphoric Acid | 18.4 |
| Deionized Water | 28.7 |
| Diisopropanol Amine | 57.8 |
| Cymel 1130 | 117.7 |
| Deionized Water | 528.4 |
| Deionized Water | 176.9 |

[1] NTAX 725 is a polyoxypropylene glycol available from Union Carbide.
[2] A 2-ethylhexyl ether of ethylene glycol, commercially available from Eastman Chemical Products, Inc.

The first three ingredients were charged to a reaction vessel and heated under a nitrogen blanket to 100° C. followed by addition of ethyltriphenylphosphonium iodide catalyst. The reaction mixture at 91.3% solids, was held for a theoretical epoxy equivalent weight (EEW) of 605 then held for another 30 minutes for a second EEW of 710. To this, was added NIAX 725, Ektasolve EEH and tridecyl alcohol and cooled to 90° C. followed by addition of phosphoric acid then let to exotherm. The reaction mixture was then cooled to 120° C., held for 30 minutes, then cooled to 105° C. At 105° C., the first portion of water was added, followed by a 2 hour hold. The reaction mixture was cooled to 90° C. followed by addition of diisopropanol amine and the Cymel 1130 crosslinker, then held for 30 minutes. The second portion of water was then added over ½ hour then mixed for a further 30 minutes. The last portion of water was then added over 10 minutes, mixed, then poured to yield a product at 43% solids by weight; and a weight-average molecular weight of 245,802, as determined by light scattering techniques using a Coulter particle size analyzer commercially available from Coulter.

An electrodepositable coating composition was prepared using the following of ingredients:

| INGREDIENTS | PARTS BY WEIGHT |
| --- | --- |
| Phosphatized Epoxy, as prepared above | 691 |
| Deionized Water | 1309 |

The ingredients were added to a plastic gallon container and mixed under gentle agitation. The resulting paint had a pH of 8.58, as measured with an ACCUMET pH meter commercially available from Fisher Scientific; and a conductivity of $1808.91^{\Omega-1}$ as measured with a conductivity meter commercially available from YSI, Inc.

The coating composition was deposited onto aluminum test panels commercially available from Q Panel Lab Products, as A-412. This was done by heating the coating composition to 27° C. then impressing 100 volts between the test panel and a stainless steel anode for two minutes. The test panels were cured for 20 minutes at 121° C. to produce an average film thickness of 0.62 mils. Various physical tests were performed on the coated substrates, as detailed in Table IV.

TABLE IV

Physical Properties of Films Prepared from the Composition of Example V

| Bake Schedule | 20 minutes at 121° C. |
| --- | --- |
| 20° Gloss[1] | 113 |
| 60° Gloss[1] | 204 |
| Solvent Resistance[2] | 100X Pass |
| Crosshatch Adhesion[3] | 10, no loss of adhesion |

[1–3]see notes [1–3], respectively, for Table I

EXAMPLE VI

A polyester epoxy backbone composed of a cycloaliphatic dicarboxylic acid and hydrogenated bisphenol A diol, modified by a hydroxy pivalic acid/cyclohexane dicarboxylic acid adduct (2:1), a sulfonium resin therefrom, and its formulation with a polyester quat grind vehicle.

A sulfonium polyester resin was prepared from the following ingredients:

| INGREDIENTS | PARTS BY WEIGHT |
| --- | --- |
| Epoxy resin of Example IV | 1439.6 |
| CHDA-HPA Adduct[1] | 420.6 |
| Ethyltriphenylphosphonium Iodide | 2.9 |
| PROPASOL ® B | 254.7 |
| Thiodiethanol | 307.4 |
| Lactic Acid (88% actives in Water) | 128.9 |
| Deionized Water | 68 |
| Crosslinker[2] | 1501.8 |
| Deionized Water | 4184.9 |

[1]The adduct is based on 1,4-cyclohexanedicarboxylic acid and hydroxy pivalic acid at a 1:2 ratio, respectively. 81.6% solids by weight in MIBK.
[2]Crosslinker is based on 1,6-hexamethylene diisocyanate (HDI) Trimer (DESN 3300 ®) available from Bayer Corporation blocked with dibutyl amine. 75% solids by weight in MIBK.

The first two ingredients were charged to a reaction vessel and heated under a nitrogen blanket to 105° C. and held at temperature until the CHDA-HPA adduct completely dissolved. The ethyltriphenylphosphonium iodide catalyst was added and the reaction allowed to exotherm followed by a one hour hold at 130° C. for a theoretical epoxy equivalent weight (EEW) of 1218. The solvent PROPASOL® B was added to cool the reaction to 75° C. followed by addition of thiodiethanol, lactic acid and the first portion of water. The reaction mixture was then heated to 75° C. and held for 6 hours to an acid value of 4.01. The crosslinker was then added, mixed for 15 minutes then added to the final portion of water under agitation to produce a dispersion of organic resin in an aqueous phase. The resin dispersion was then vacuum stripped at 60° C. to remove volatile solvents. The resulting dispersion was 35% solids (on theory) by weight.

The polyester quat grind vehicle was prepared from the following ingredients:

| INGREDIENTS | PARTS BY WEIGHT |
| --- | --- |
| Epoxy resin of Example IV | 1617.8 |
| CHDA-HPA Adduct[1] | 470.3 |
| Ethyltriphenylphosphonium Iodide | 2.1 |
| PROPASOL ® B | 184.2 |
| Half-capped IPDI[2] | 267.8 |
| N,N-Dimethylethanolamine | 89.7 |
| Lactic Acid (88% actives in water) | 103.1 |
| Deionized Water | 54 |
| PROPASOL ® B | 469.4 |

[1]The adduct is based on cyclohexane dicarboxylic acid and hydroxy pivalic acid at 1:2 ratio, respectively. 81% solids in MIBK.
[2]Isophorone diisocyanate with half of the isocyanate content reacted with 2-ethylhexanol. 80% solids in MIBK The first two ingredients were charged to a reaction vessel and heated under a nitrogen blanket to 105° C. and held at temperature until the CHDA-HPA adduct completely dissolved. The ethyltriphenylphosphonium iodide catalyst was added and the reaction allowed to exotherm followed by a one hour hold at 130° C. for a theoretical epoxy equivalent weight (EEW) of 1197. The solvent PROPASOL® B was added to cool the reaction to 75° C. followed by addition of the half-capped IPDI over 15 minutes. The reaction was then held until there was no more isocyanate by IR spectroscopy. The quat salt was then formed by adding n,n-dimethylethanolamine, lactic acid and water followed by a hold for a stalled acid value. The final portion of water was added under agitation to produce a dispersion of organic resin in an aqueous phase at 65% solids (on theory).

The white tint paste was prepared using the following mixture of ingredients:

| INGREDIENTS | PARTS BY WEIGHT |
| --- | --- |
| Polyester Quat Grind Resin, as prepared above (Actual solids 68.52% by weight) | 658.7 |
| Deionized Water | 950.0 |
| Titanium Dioxide Pigment | 1813.2 |
| Dibutyltin Oxide Paste[1] | 45.5 |

[1]A PPG proprietary commercial catalyst paste containing 30.8% dibutyltin oxide.

The ingredients were sequentially added to an appropriate container under agitation, and mixed until well blended. A RED HEAD laboratory dispersion mill, commercially available from Chicago Boiler Company, was filled with ceramic beads, and cold water was circulated through the unit's cooling jacket. The mixture prepared above was added to the dispersion mill and ground for 45 minutes. After grinding, the particle size was reduced to a Hegman of 7, as measured using a Hegman fineness of grind gauge commercially available from Gardner Company. The mixture was then drained from the mill as agitation continued, until the flow of product nearly stopped.

An electrodepositable coating composition was prepared using the following mixture of ingredients:

| INGREDIENTS | PARTS BY WEIGHT |
| --- | --- |
| Sulfonium Polyester Resin, as prepared above. (Actual solids of 33.73% by weight) | 2010.4 |
| PROPASOL ® B | 25.8 |
| White Tine Paste, as prepared above | 355.1 |
| Dibutyltin Oxide Paste[1] | 31.6 |
| Deionized Water | 5226.0 |

[1]A PPG proprietary commercial catalyst paste containing 30.8% dibutyltin oxide.

The ingredients were added to a plastic gallon container and mixed under gentle agitation. The resulting paint had a pH of 5.41 as measured with an ACCUMET pH meter commercially available from Fisher Scientific; and a conductivity of 600 $1^{\Omega-}$ as measured with a conductivity meter commercially available from YSI, Inc.

The coating composition was deposited onto Aluminum 6022 alloy test panels commercially available from ACT Laboratories, Inc. as APR 32869 pretreated with Nupal® 435, a pretreatment commercially available from PPG Industries, Inc. This was done by heating the coating composition to 36.1° C. and applying a 100 volts between the test panel and a stainless steel anode for two minutes. The test panels were cured for 30 minutes at 171.1° C. to produce an average film thickness of 1.0 mil. Various physical tests were performed on the coated substrates, as detailed in Table VI.

TABLE V

Physical Properties of Films Prepared from the Composition of Example VI

| Bake Schedule | 30 minutes at 171.1° C. |
| --- | --- |
| 20° Gloss[1] | 88.9 |
| 60° Gloss[1] | 68.2 |
| Solvent Resistance[2] | 100X, Pass |

[1]-[2]see notes [1]-[2], respectively, for Table I.

EXAMPLE VII

This Example demonstrates UV durability as measured by gloss retention of the polyester backbone resin versus an acrylic backbone, both formulated using a paste made from the same grind vehicle.

The polyester grind vehicle was prepared from the following ingredients:

| INGREDIENTS | PARTS BY WEIGHT |
| --- | --- |
| Shell Eponex 1510[1] | 470.0 |
| CHDA-HPA Adduct[2] | 264.6 |
| Ethyltriphenylphosphonium Iodide | 0.81 |
| PROPASOL ® B | 70.42 |
| N,N-Dimethylethanolamine | 37.38 |
| Lactic Acid (88% actives) | 42.97 |
| Deionized Water | 36.00 |
| Deionized Water | 1391.5 |

[1]A hydrogenated bis-phenol A epoxy material from Shell Chemical Company having epoxy equivalent weight of 235.
[2]The adduct is based on cyclohexane dicarboxylic acid and hydroxy pivalic acid at 1:2 ratio, respectively. 100% solids.

The first two ingredients were charged to a reaction vessel and heated under a nitrogen blanket to 105° C. and held at temperature until the CHDA-HPA adduct completely dissolved. The ethyltriphenylphosphonium iodide catalyst was added and the reaction allowed to exotherm followed by a one hour hold at 130° C. for a theoretical EEW of 1225. The solvent PROPASOL B was added to cool the reaction to 75° C. followed by addition of n,n-dimethylethanolamine, lactic acid and water. The reaction was then heated to 75° C. and held for a stalled acid value. At the stalled acid value, the final portion of water was added under agitation to produce a dispersion of organic resin in an aqueous phase at 35.28% solids.

The white paste was prepared from the following ingredients:

| INGREDIENTS | PARTS BY WEIGHT |
| --- | --- |
| Polyester Grind Resin, as describe in VII above | 835.1 |
| Titanium Dioxide Pigment | 1780.9 |
| Deionized Water | 393.2 |

The ingredients were sequentially added to an appropriate container under agitation, and mixed until well blended. A RED HEAD laboratory dispersion mill, commercially available from Chicago Boiler Company, was filled with ceramic beads, and cold water was circulated through the unit's cooling jacket. The mixture prepared above was added to the dispersion mill and ground for 1 hour. After grinding, the particle size was reduced to a Hegman of 7, as measured using a Hegman fineness of grind gauge commercially available from Gardner Company. The mixture was then drained from the mill as agitation continued, until the flow of product nearly stopped.

The Dibutyl tin oxide catalyst paste was prepared as described below.

| INGREDIENTS | PARTS BY WEIGHT |
| --- | --- |
| Grind Vehicle described in VII above | 556.50 |
| Butyl Carbitol Formal | 25.10 |
| Dibutyl Tin Oxide | 321.64 |
| Deionized water | 85.28 |
| Lactic Acid (10% by weight in deionized water) | 37.08 |

The ingredients were sequentially added to an appropriate container under agitation, and mixed until well blended. A RED BEAD laboratory dispersion mill, commercially available from Chicago Boiler Company, was filled with ceramic beads, and cold water was circulated through the unit's cooling jacket. The mixture prepared above was added to the dispersion mill and ground for 3 hours. The mixture was then drained from the mill as agitation continued, until the flow of product nearly stopped.

The electrodepositable coating compositions were prepared using the following mixture of ingredients:

Polyester Paint Composition (A)

| INGREDIENTS | PARTS BY WEIGHT |
|---|---|
| Sulfonium Polyester Resin, as described in Example VI. (Actual solids of 42.56% by weight) | 693.15 |
| Butyl CARBITOL | 11.80 |
| Dibutyl Tin Oxide Catalyst paste as prepared above. | 10.64 |
| White Paste, as prepared above | 308.25 |
| Deionized Water | 2476.16 |

Acrylic Paint Composition (B)

| INGREDIENTS | PARTS BY WEIGHT |
|---|---|
| Acrylic Resin[1] | 1025.67 |
| Dibutyl Tin Oxide Catalyst paste as prepared above. | 5.32 |
| White Paste, as prepared above | 311.11 |
| Deionized Water | 2157.9 |

[1]Powercron CR920 Acrylic resin commercially available from PPG Inc. 30% solids.

The same procedures illustrated in Example VI were followed in preparing the electrodepositable paints. Durability was rated as a measure of gloss retention as summarized in Table VI below.

TABLE VI

Physical Properties of Films Prepared from the Composition of Example VII

| Paint | Light Hours[1] | 60° Gloss[2] | 20° Gloss[2] | % 60° Gloss Retention | % 20° Gloss Retention |
|---|---|---|---|---|---|
| Polyester paint (A) | 0 | 82.5 | 45.8 | | |
| Polyester paint (A) | 189.5 | 74.9 | 36.3 | 90.8 | 79.3 |
| Acrylic paint (B) | 0 | 58 | 13 | | |
| Acrylic paint (B) | 189.5 | 38.6 | 4 | 66.6 | 30.8 |

[1]The baked films were subjected to 8 hours of UVB 313 bulb exposure followed by 4 hours condensation for a total of 189.5 light hours. Exposure testing was done using a Q-Panel inc. QUV accelerated weathering tester.
[2]As measured using a Multigloss meter, commercially available from BYK Gardner.

The above invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

We claim:

1. An electrodepositable composition comprising a resinous phase dispersed in an aqueous medium, the resinous phase comprising a cationic polyester polymer, comprising the reaction product of the following reactants:
   a. a cycloaliphatic carboxylic acid compound comprising at least two secondary aliphatic carboxyl groups, or an anhydride thereof;
   b. a branched aliphatic, or cycloaliphatic compound containing at least two aliphatic hydroxyl groups, said aliphatic hydroxyl groups being secondary hydroxyl groups or primary hydroxyl groups attached to a carbon adjacent to a tertiary or quaternary carbon; and
   c. a compound comprising a cationic salt group or a group which is converted to a cationic salt group, wherein said group is attached to an aliphatic moiety.

2. An electrodepositable composition comprising a resinous phase dispersed in an aqueous medium, the resinous phase comprising a cationic polyester polymer, comprising the reaction product of the following reactants:
   a. an aromatic and/or cycloaliphatic carboxylic acid compound comprising at least two aromatic and/or secondary aliphatic carboxyl groups or an anhydride thereof;
   b. a branched aliphatic, cycloaliphatic or araliphatic compound containing at least two aliphatic hydroxyl groups, said aliphatic hydroxyl groups being either secondary or tertiary hydroxyl groups or primary hydroxyl groups attached to a carbon adjacent to a tertiary or a quaternary carbon;
   c. a compound comprising a cationic salt group or a group which is converted to a cationic salt group; and
   d. a reactant having at least one hydroxyl substituted carboxylic compound comprising at least one tertiary aliphatic carboxyl group and at least one aliphatic hydroxyl group.

3. The electrodepositable composition of claim 1, the cationic polyester polymer having a cationic salt group equivalent weight of 1,000 to 10,000.

4. The electrodepositable composition of claim 1, wherein the carboxyl:hydroxyl equivalent ratio of a to b is greater than 1.

5. The electrodepositable composition of claim 1, wherein the carboxyl:hydroxyl equivalent ratio of a to b is within the range of 1.1 to 2:1.

6. The electrodepositable composition of claim 2, wherein the carboxyl:hydroxyl equivalent ratio of a to (b+d) is 0.1 to 2:1.

7. The electrodepositable composition of claim 2, in which the hydroxyl equivalent ratio of b to d is 0.1 to 10:1.

8. The electrodepositable composition of claim 1, in which the cationic salt group is selected from the group consisting of an amine salt group, a quaternary ammonium salt group and a tertiary sulfonium group.

9. The electrodepositable composition of claim 8, in which the cationic salt group is a tertiary sulfonium group.

10. The electrodepositable composition of claim 1, in which compound (a) is a cycloaliphatic dicarboxylic acid.

11. The electrodepositable compound of claim 10, in which compound (a) is selected from the group consisting of a cyclohexyldicarboxylic acid, a methyl hexahydrophthalic acid and a hexahydrophthalic acid.

12. The electrodepositable composition of claim 1, wherein compound (b) is a branched aliphatic compound which contains two aliphatic hydroxyl groups.

13. The electrodepositable composition of claim 12, wherein compound (b) is 2-ethyl 2-butyl propane-1,3-diol.

14. The electrodepositable composition of claim 1, wherein compound (b) is a cycloaliphatic compound which contains two hydroxyl groups.

15. The electrodepositable composition of claim 14, wherein compound (b) is selected from the class consisting of hydrogenated bisphenol A and a cyclohexanedimethanol.

16. The electrodepositable composition of claim 2, wherein compound (d) is selected from the group consisting of dimethylolylpropionic acid and hydroxypivalic acid.

17. The electrodepositable composition of claim 2, wherein the cationic polyester is formed from a precursor compound having formula I:

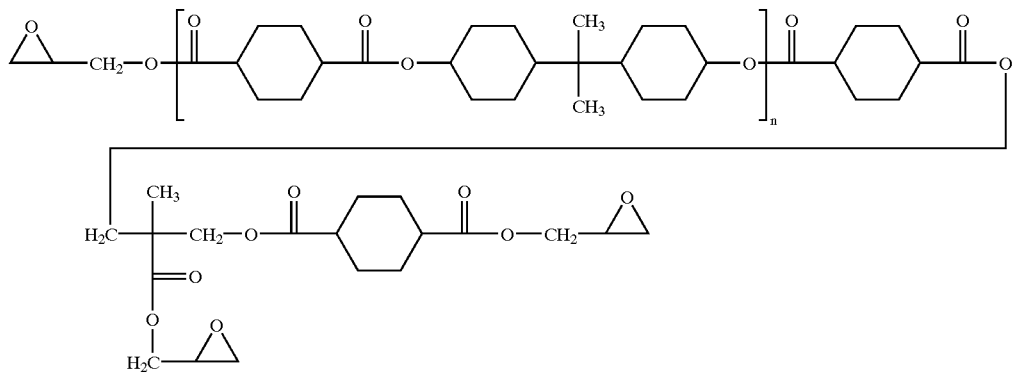

wherein n=1–5.

18. The electrodepositable composition of claim 2, wherein the cationic polyester is formed from a precursor compound having formula II:

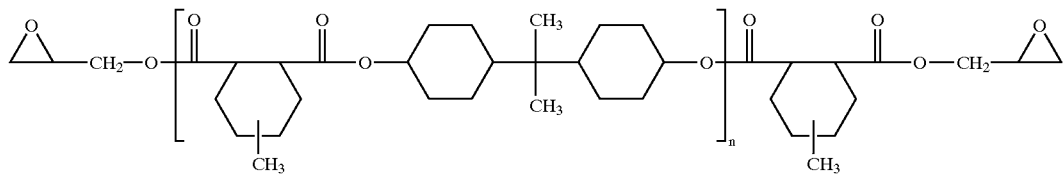

wherein n=1–15.

19. The electrodepositable composition of claim 2, wherein the cationic polyester is formed from a precursor compound having formula III:

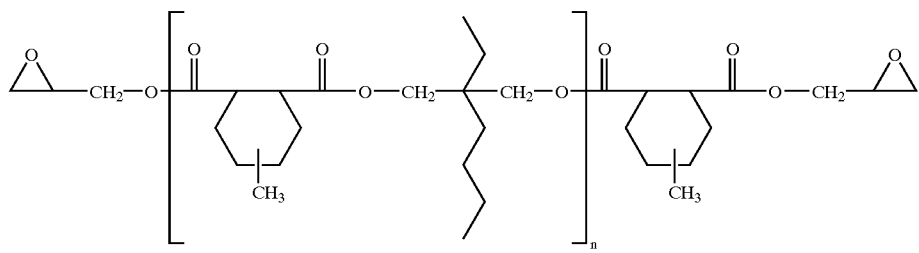

wherein n=1–15.

20. The electrodepositable composition of claim 1 in which the cationic polyester contains a sterically bulky group grafted thereto.

21. The electrodepositable composition of claim 1 in which the cationic polyester polymer contains reactive functional groups, the composition further comprising a curing agent having functional groups reactive with the reactive functional groups of the cationic polyester polymer.

22. The electrodepositable composition of claim 21, wherein the reactive functional groups of the cationic polyester are hydroxyl groups and the curing agent is one of a blocked isocyanate, optionally grafted to the cationic polyester, and an aminoplast.

23. The electrodepositable composition of claim 21, wherein the curing agent is present in amounts of 20 to 50 percent by weight based on total weight of resin solids.

24. The electrodepositable composition of claim 2, wherein (a) is methyl hexahydrophthalic acid, (b) is hydrogenated bisphenol A, (d) is dimethylolpropionic acid and the cationic salt group is a tertiary sulfonium group.

25. An electrodepositable cationic resin derived from a polyepoxy polyester comprised of a glycidyl ester group attached to an alkyl group, wherein said alkyl group is saturated and the carbon to which said glycidyl ester group is attached is a secondary or tertiary carbon.

26. The resin of claim 25, wherein the resin is rendered cationic by a reaction between the glycidyl ester group and a cationic salt forming group selected from amine, phosphine and sulfide.

27. An electrodepositable cationic resin derived from a polyepoxy polyester comprised of a glycidyl ester group attached to an alkyl group, wherein said alkyl group is saturated, the carbon to which said glycidyl ester group is attached is a secondary or tertiary carbon, and the polyepoxy compound is formed from a reactant having at least one hydroxyl substituted carboxylic compound comprising at least one tertiary aliphatic carboxyl group and at least one aliphatic hydroxyl group.

28. The resin of claim 25, wherein said polyepoxide is formed from a compound selected from cyclohexyldicarboxylic acid, a methyl hexahydrophthalic acid and a hexahydrophthalic acid.

29. A method for electrocoating a conductive substrate comprising electrodepositing on said substrate, the composition of claim 1.

30. A method for electrocoating a conductive substrate comprising electrodepositing on said substrate, the composition of claim 2.

31. A method for electrocoating a conductive substrate comprising electrodepositing on said substrate, the composition of claim 3.

32. A method for electrocoating a conductive substrate comprising electrodepositing on said substrate, the composition of claim 4.

33. A method for electrocoating a conductive substrate comprising electrodepositing on said substrate, the composition of claim 5.

34. A method for electrocoating a conductive substrate comprising electrodepositing on said substrate, the composition of claim 6.

35. A method for electrocoating a conductive substrate comprising electrodepositing on said substrate, the composition of claim 7.

36. A method for electrocoating a conductive substrate comprising electrodepositing on said substrate, the composition of claim 8.

37. A method for electrocoating a conductive substrate comprising electrodepositing on said substrate, the composition of claim 9.

38. A method for electrocoating a conductive substrate comprising electrodepositing on said substrate, the composition of claim 10.

39. A method for electrocoating a conductive substrate comprising electrodepositing on said substrate, the composition of claim 11.

40. A method for electrocoating a conductive substrate comprising electrodepositing on said substrate, the composition of claim 12.

41. A method for electrocoating a conductive substrate comprising electrodepositing on said substrate, the composition of claim 13.

42. A method for electrocoating a conductive substrate comprising electrodepositing on said substrate, the composition of claim 14.

43. A method for electrocoating a conductive substrate comprising electrodepositing on said substrate, the composition of claim 15.

44. A method for electrocoating a conductive substrate comprising electrodepositing on said substrate, the composition of claim 16.

45. A method for electrocoating a conductive substrate comprising electrodepositing on said substrate, the composition of claim 17.

46. A method for electrocoating a conductive substrate comprising electrodepositing on said substrate, the composition of claim 18.

47. A method for electrocoating a conductive substrate comprising electrodepositing on said substrate, the composition of claim 19.

48. A method for electrocoating a conductive substrate comprising electrodepositing on said substrate, the composition of claim 20.

49. A method for electrocoating a conductive substrate comprising electrodepositing on said substrate, the composition of claim 21.

50. A method for electrocoating a conductive substrate comprising electrodepositing on said substrate, the composition of claim 22.

51. A method for electrocoating a conductive substrate comprising electrodepositing on said substrate, the composition of claim 23.

52. A method for electrocoating a conductive substrate comprising electrodepositing on said substrate, the composition of claim 24.

53. A method for electrocoating a conductive substrate comprising electrodepositing on said substrate, the composition of claim 25.

54. A method for electrocoating a conductive substrate comprising electrodepositing on said substrate, the composition of claim 26.

55. A method for electrocoating a conductive substrate comprising electrodepositing on said substrate, the composition of claim 27.

56. A method for electrocoating a conductive substrate comprising electrodepositing on said substrate, the composition of claim 28.

* * * * *